US012029345B2

(12) United States Patent
Brown et al.

(10) Patent No.: US 12,029,345 B2
(45) Date of Patent: Jul. 9, 2024

(54) COUNTERTOP COOKING SYSTEM

(71) Applicant: SharkNinja Operating LLC, Needham, MA (US)

(72) Inventors: Ethan T. Brown, Cambridge, MA (US); Joshua D. Anthony, North Billerica, MA (US); Nathaniel R. Lavins, Cambridge, MA (US); Christopher T. Martin, North Attleboro, MA (US); John M. Steinmetz, Philadelphia, PA (US); David Hensel, Boston, MA (US)

(73) Assignee: SharkNinja Operating, LLC, Needham, MA (US)

(*) Notice: Subject to any disclaimer, the term of this patent is extended or adjusted under 35 U.S.C. 154(b) by 159 days.

(21) Appl. No.: 17/385,246

(22) Filed: Jul. 26, 2021

(65) Prior Publication Data
US 2022/0022690 A1 Jan. 27, 2022

Related U.S. Application Data

(60) Provisional application No. 63/056,970, filed on Jul. 27, 2020.

(51) Int. Cl.
A47J 37/06 (2006.01)
F24C 7/04 (2021.01)
(Continued)

(52) U.S. Cl.
CPC ....... *A47J 37/0641* (2013.01); *A47J 37/0629* (2013.01); *F24C 7/046* (2013.01); *F24C 7/067* (2013.01); *F24C 15/325* (2013.01)

(58) Field of Classification Search
CPC ... A47J 37/0629; A47J 37/0641; F24C 7/067; F24C 15/322; F24C 7/046
See application file for complete search history.

(56) References Cited

U.S. PATENT DOCUMENTS 4,467,777 A * 8/1984 Weber ................... F24C 15/325
219/400
5,801,362 A 9/1998 Pearlman et al.
(Continued)

FOREIGN PATENT DOCUMENTS

GB 2062847 A * 8/1979
GB 2054833 A 2/1981

OTHER PUBLICATIONS

Extended European Search Report issued in European Application No. 21187988.7, dated Dec. 17, 2021, 9 pages.
(Continued)

*Primary Examiner* — Thien S Tran
(74) *Attorney, Agent, or Firm* — Mintz, Levin, Cohn, Ferris, Glovsky and Popeo, P.C.

(57) ABSTRACT

A cooking system positionable on a support surface including a housing including at least a top wall, bottom wall, and side walls, said housing defining a hollow chamber including a cooking chamber and a convecting chamber. A convection heater is disposed within the convecting chamber. At least one fluidly communicable opening extends between the convecting chamber and the cooking chamber. The at least one fluidly communicable opening fully extends between the top wall and the bottom wall of the housing.

14 Claims, 8 Drawing Sheets

(51) Int. Cl.
   *F24C 7/06*      (2006.01)
   *F24C 15/32*     (2006.01)

(56)      References Cited

U.S. PATENT DOCUMENTS 5,816,234 A        10/1998  Vasan
    5,880,436 A  *    3/1999   Keogh ................. F24C 15/322
                                                        219/400
   10,539,331 B2       1/2020   Seok et al.
   10,561,277 B1       2/2020   Swayne et al.
 2006/0272632 A1      12/2006   Duncan et al.
 2006/0289436 A1      12/2006   Carbone et al.
 2009/0064984 A1       3/2009   Kuhne
 2014/0110391 A1 *    4/2014   Estrella ................ F24C 15/325
                                                        219/400
 2016/0327280 A1 *   11/2016   Smith .................... F24C 7/087

OTHER PUBLICATIONS

International Search Report and Written Opinion received for PCT Application No. PCT/US2021/043190, dated Nov. 1, 2021, 8 pages.

* cited by examiner

COUNTERTOP COOKING SYSTEM

CROSS REFERENCE TO RELATED APPLICATION

This application claims the benefit of U.S. Provisional Application No. 63/056,970 filed Jul. 27, 2020 entitled "Countertop Cooking System," which is hereby incorporated herein by reference in its entirety.

FIELD

Embodiments of the present disclosure relate generally to a cooking system, and more particularly, to a countertop cooking system capable of performing several different cooking operations.

BACKGROUND

Existing countertop cooking systems, such as toaster ovens for example, may be used to conveniently warm or cook food in place of a larger wall mounted oven or a range for example. Such ovens that do not cook via forced convection can be limited in their cooking applications, such as an ability to evenly cook multiple layers of food without moving the food during the cooking cycle. This is because the top layer receives radiation from one or more heating elements at the top of the cooking system and the bottom layer receives radiation from one or more heating elements at the bottom of the cooking system. Additionally, the interior cavity of the oven heats up and also radiates onto the food, especially the top of the top layer and the bottom of the bottom layer, due to their proximity and exposure to the ceiling and floor, respectively. However, the middle area between the top and bottom layers receives less radiation, and therefore is cooked more slowly.

Traditional convection ovens solve this problem of unequal heating by circulating air through the oven via a fan. Although such systems result in more even cooking, the fans typically used in these convection systems are small and do not move large volumes of air. Further, the ovens are not designed to evenly distribute the air across the full oven. As a result, the air is not evenly circulated, resulting in hotspots and uneven cooking. The air also does not move at a high enough volume or velocity to contribute significantly to cooking beyond the existing radiation from the top and bottom of the oven (from either the heating elements or the ceiling and floor of the oven), resulting in uneven cooking. In addition, some of these fans cause the air to spin, which can cause increased cooking at the areas where the air originally contacts the food.

SUMMARY

According to an embodiment, a cooking system positionable on a support surface including a housing including at least a top wall, bottom wall, and side walls, said housing defining a hollow chamber including a cooking chamber and a convecting chamber. A convection heater is disposed within the convecting chamber. At least one fluidly communicable opening extends between the convecting chamber and the cooking chamber. The at least one fluidly communicable opening fully extends between the top wall and the bottom wall of the housing.

In addition to one or more of the features described above, or as an alternative, in further embodiments said convection heater includes an air movement device and a convection heating element for heating an air flow moved by said air movement device.

In addition to one or more of the features described above, or as an alternative, in further embodiments said convection heating element is mounted concentrically with said air movement device.

In addition to one or more of the features described above, or as an alternative, in further embodiments said cooking system further comprises a fan shroud mounted within said hollow chamber, wherein a portion of said fan shroud forms a partition between said cooking chamber and said convecting chamber.

In addition to one or more of the features described above, or as an alternative, in further embodiments said fan shroud is mounted to a portion of said housing.

In addition to one or more of the features described above, or as an alternative, in further embodiments said housing further includes a rear wall, and said fan shroud is positioned adjacent said rear wall.

In addition to one or more of the features described above, or as an alternative, in further embodiments said fan shroud is positioned adjacent one of said side walls of said housing.

In addition to one or more of the features described above, or as an alternative, in further embodiments said fan shroud has a first wall and said at least one fluidly communicable opening between said convecting chamber and said cooking chamber is formed adjacent a lateral side of said first wall.

In addition to one or more of the features described above, or as an alternative, in further embodiments a plurality of sides extend from said first wall at an angle.

In addition to one or more of the features described above, or as an alternative, in further embodiments said fan shroud additionally includes a second wall separated from said first wall by a distance, said plurality of sides extending between said first wall and said second wall.

In addition to one or more of the features described above, or as an alternative, in further embodiments said inlet of said convecting chamber is arranged adjacent a center of said first wall and said at least one fluidly communicable opening between said convecting chamber and said cooking chamber defines an outlet of said convection chamber.

In addition to one or more of the features described above, or as an alternative, in further embodiments said inlet of said convecting chamber includes a through hole formed in said first wall, and a portion of said convection heater is mounted adjacent said through hole.

In addition to one or more of the features described above, or as an alternative, in further embodiments comprising a guide mounted directly adjacent said outlet of said chamber, wherein a contour of said guide is selected to direct an air flow at said outlet towards said cooking chamber.

In addition to one or more of the features described above, or as an alternative, in further embodiments said guide has a generally arcuate contour.

In addition to one or more of the features described above, or as an alternative, in further embodiments comprising a guard mounted adjacent to said inlet to said chamber, said guard being located upstream from said convection heater relative to a flow of air circulating within said hollow interior.

In addition to one or more of the features described above, or as an alternative, in further embodiments comprising at least one heating element mounted within said cooking chamber.

In addition to one or more of the features described above, or as an alternative, in further embodiments said at least one heating element is a radiant heating element.

In addition to one or more of the features described above, or as an alternative, in further embodiments said at least one heating element is at least one first heating element arranged near a top wall and at least one second heating element mounted near said bottom wall.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
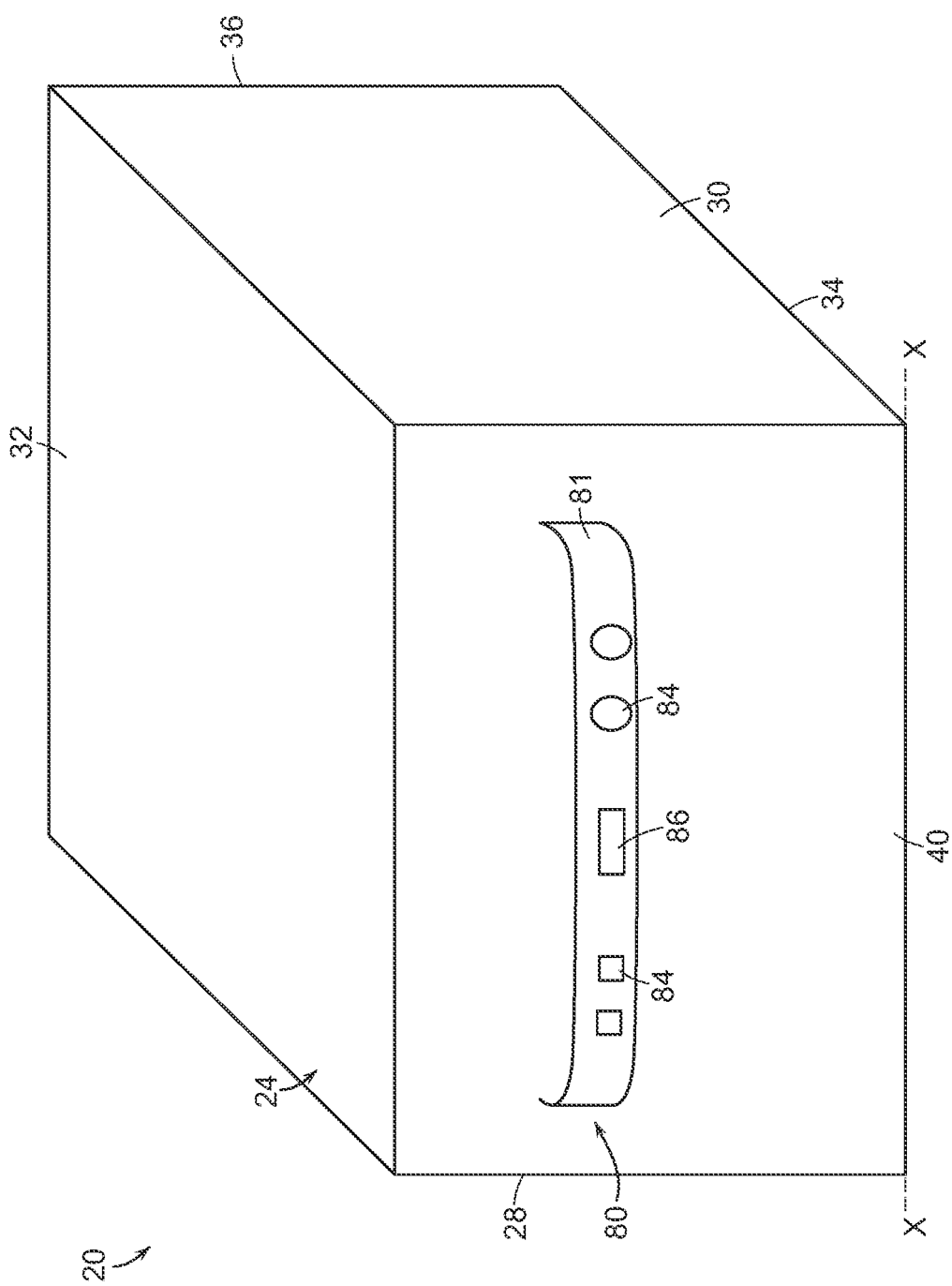
FIG. 1 is a front perspective view of a cooking system according to an embodiment.
Figure 2:
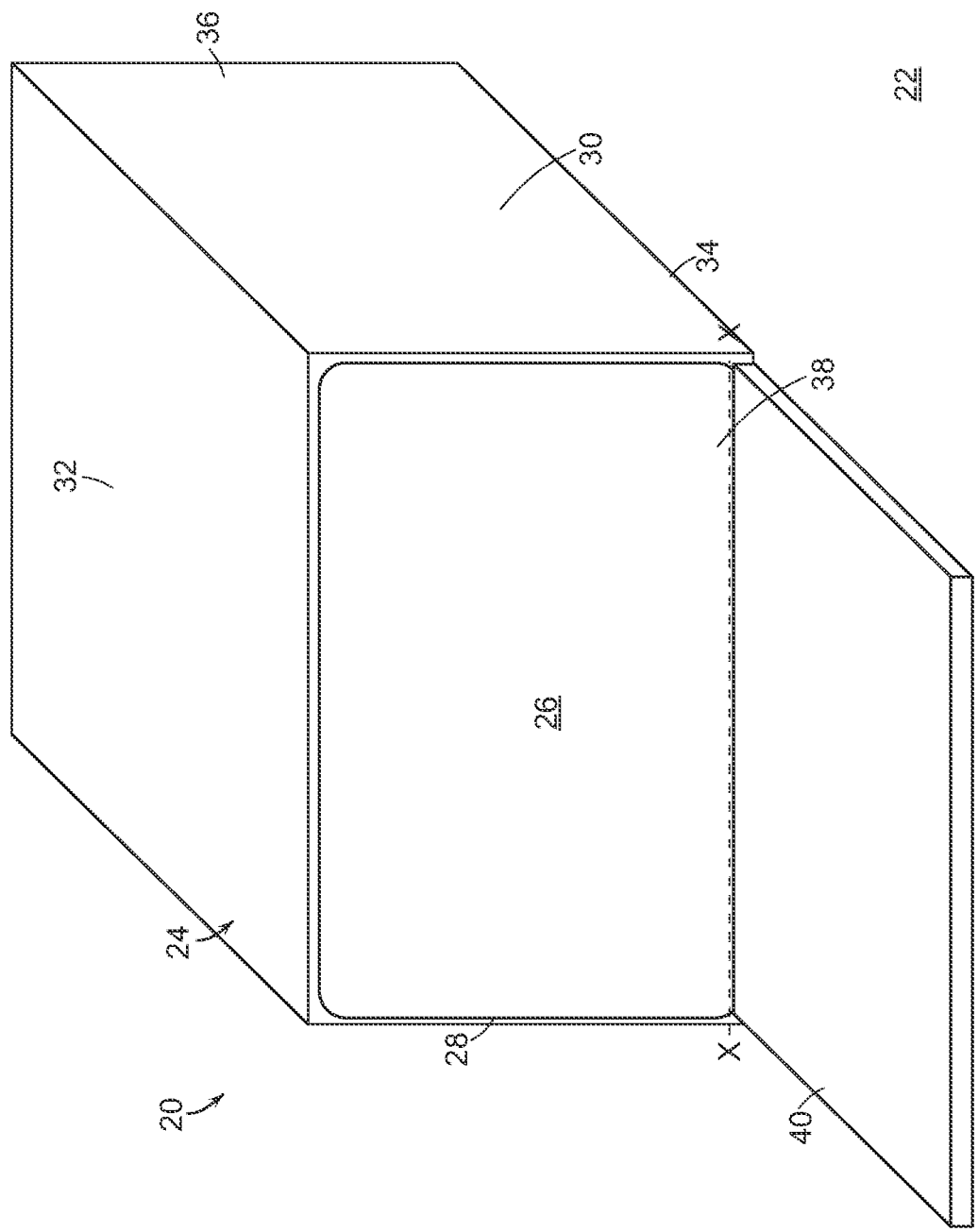
FIG. 2 is a front perspective view of a cooking system with a door in an open position according to an embodiment.

With reference now to the FIGS. 1 and 2, an example of a cooking system 20 suitable for use on a support surface 22, such as a countertop for example, is illustrated. The cooking system 20 includes a thermally insulated housing 24 that defines a generally hollow chamber 26. In the illustrated, non-limiting embodiment, the housing 24 includes a left sidewall 28, a right sidewall 30, a top 32, a bottom 34, and a back or rear wall 36 connected together to define the chamber 26 there between. In an embodiment, relatively front ends of the side, top, and bottom walls define an access opening 38 (see FIG. 2) through which the chamber 26 is accessed by a user. However, it should be understood that embodiments where the housing 24 includes a relatively small front wall extending from one or more of the side, top, and bottom walls and defining a portion of the opening 38 are also within the scope of the disclosure.

In an exemplary embodiment, the housing 24 includes a door 40 that is hinged along the bottom wall 34 or lower portions of the side walls 28, 30, and movable relative to the remainder of the housing 24 to selectively provide access to the chamber 26 through the opening 38. As shown in the illustrated, non-limiting embodiment, the door 40 includes a transparent panel and is rotatable about a hinge axis X between an open position (FIG. 2) and a closed position (FIG. 1). Although the hinge axis X is illustrated as being located at bottom of the door 40, adjacent the bottom wall 34, embodiments where the hinge axis is defined at another portion of the housing 24, such as along the left sidewall 28 or the right sidewall 30 of the housing 24 for example, are also within the scope of the disclosure. Further, although the door 40 is described as being pivotable about a hinge axis X, it should be understood that embodiments where the door 40 is configured to translate relative to the housing 24, or where the door 40 is removably coupled to the housing 24 are also contemplated herein.

In some embodiments, as shown in FIGS. 1 and 2, the door 40 may extend between and abut against the side walls 28, 30, the top wall 32 and the bottom wall 34 to cover the entire opening 38 when closed. Alternatively, in other embodiments, the door 40 may cover or seal only a portion of the opening 38. In such embodiments, a front wall (not shown) of the housing 24 may also cover a portion of the opening 38 such that the front wall and the door when closed cooperate to seal the opening 38.

Figure 3:
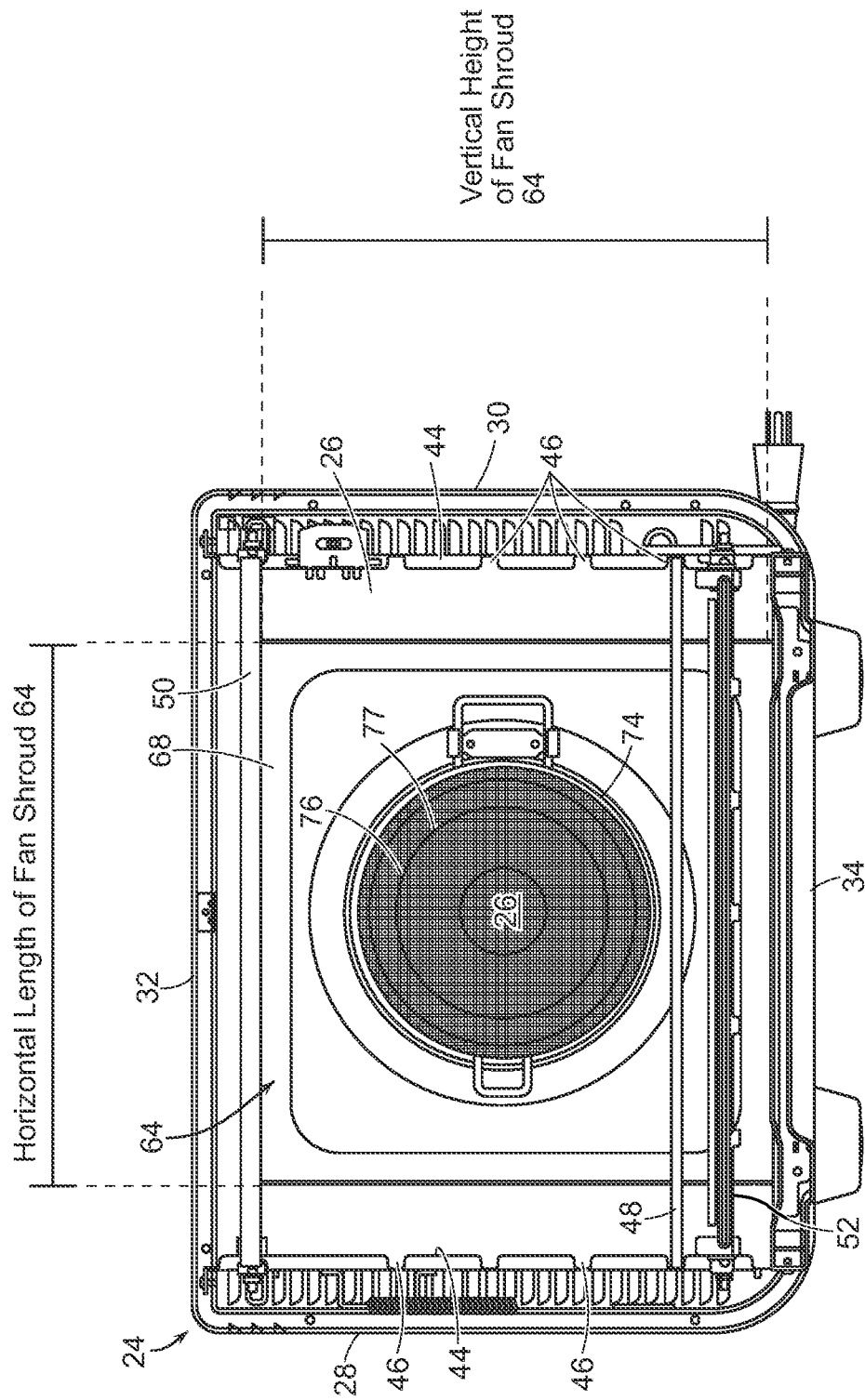
FIG. 3 is a front view of an interior of a cooking system according to an embodiment.

With reference now to FIG. 3, defined within the chamber 26 of the housing 24 is a cooking chamber 42, within which one or more food items are positionable via opening 38 to perform a cooking operation. Arranged within the cooking chamber 42 may be at least one fixture 44. In the illustrated, non-limiting embodiment, a pair of opposing fixtures 44 are mounted to or are integrally formed with an interior surface of the left sidewall 28 and the right sidewall 30, respectively. As shown, the one or more fixtures 44 may define a plurality of mounting surfaces 46, such as slots for example, arranged at different positions relative to the height of the cooking chamber 42. The mounting surfaces 46 defined by the fixtures 44 may be used to support one or more cooking accessories 48, such as a removable cooking rack, basket, spit, or drip tray for example, at a desired position within the cooking chamber 42.

In operation, the cooking chamber 42 is heated by at least one heating element. In an embodiment, the cooking system 20 includes one or more first heating elements 50 positioned within the chamber 26, and more specifically, within the cooking chamber 42, for example adjacent the top 32 of the housing 24. In the illustrated, non-limiting embodiment, the cooking system 20 includes a plurality of first heating elements 50, such as three first heating elements for example, extending generally between the left sidewall 28 and the right sidewall 30, and spaced across a depth of the top 32 of the housing 24. It should be understood that any number of first heating elements 50 and any configuration of the first heating elements 50 are contemplated herein. Alternatively, or in addition, at least one second heating element 52 may be positioned within the cooking chamber 42, for example adjacent the bottom 34 of the housing 24. In the illustrated, non-limiting embodiment of FIG. 3, the cooking system 20 includes a plurality of second heating elements 52, such as two second heating elements for example, extending generally between the left sidewall 28 and the right sidewall 30, and spaced across a depth of the bottom 34 of the housing 24. The first heating elements 50 and the second heating elements 52 may be generally vertically aligned, or may be staggered relative to one another.

In the illustrated, non-limiting embodiment, both the first and second heating elements 50, 52 are infrared heating elements operable to heat the cooking chamber 42 via radiation. However, the one or more heating elements 50, 52 of the cooking system 20 may be selected to perform any suitable type of heating, including but not limited to, radiation, conduction, convection, and induction. Accordingly, the at least one heating element 50, 52 may be any type of heating element, such as a tubular, quartz, tungsten, or halogen heating element. At least one of the first and second heating elements 50, 52 is operable in a first cooking mode to perform one or more cooking operations. Examples of cooking operations that may be performed in the first cooking mode include, but are not limited to toasting, broiling, warming and reheating for example. It should be understood that although the heating elements 50, 52 of the cooking system 20 are illustrated and described as being positioned generally adjacent the top 32 and bottom 34 of the housing 24, embodiments where the cooking system 20 alternatively or additionally includes one or more heating elements (not shown) located adjacent a side of the cooking chamber 42, or within a center of the cooking chamber 42 are also contemplated herein.

Further, it should be understood that in embodiments of the cooking system 20 having a plurality of heating elements 50, 52 arranged at multiple locations within the cooking chamber 42, the plurality of heating elements 50, 52 may be substantially identical, or alternatively, may be different, and further may be operable to perform similar or distinct types of heating.

Figure 4:
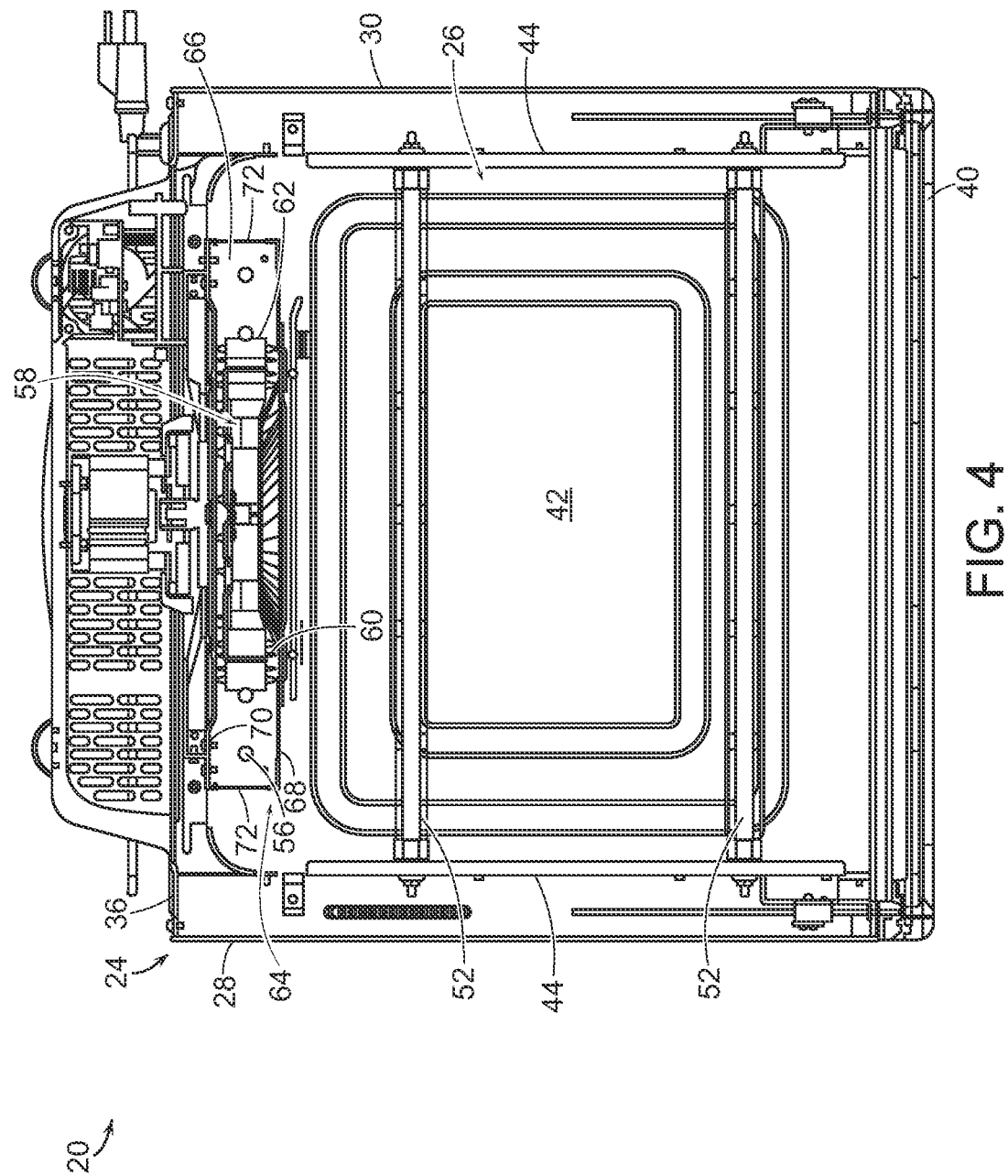
FIG. 4 is a plan view of an interior of a cooking system according to an embodiment.
Figure 5:
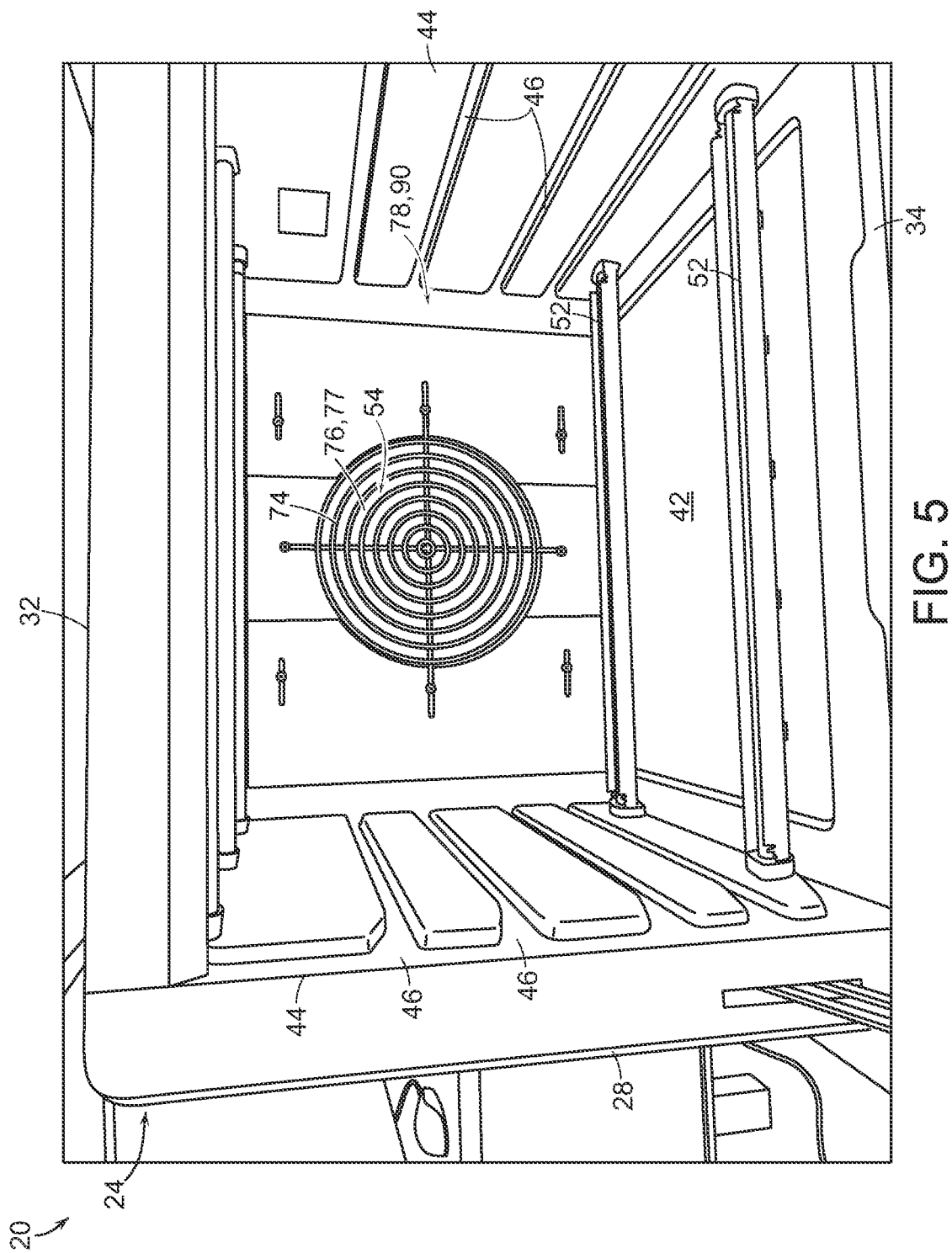
FIG. 5 is a front view of an interior of a cooking system according to an embodiment.
Figure 6:
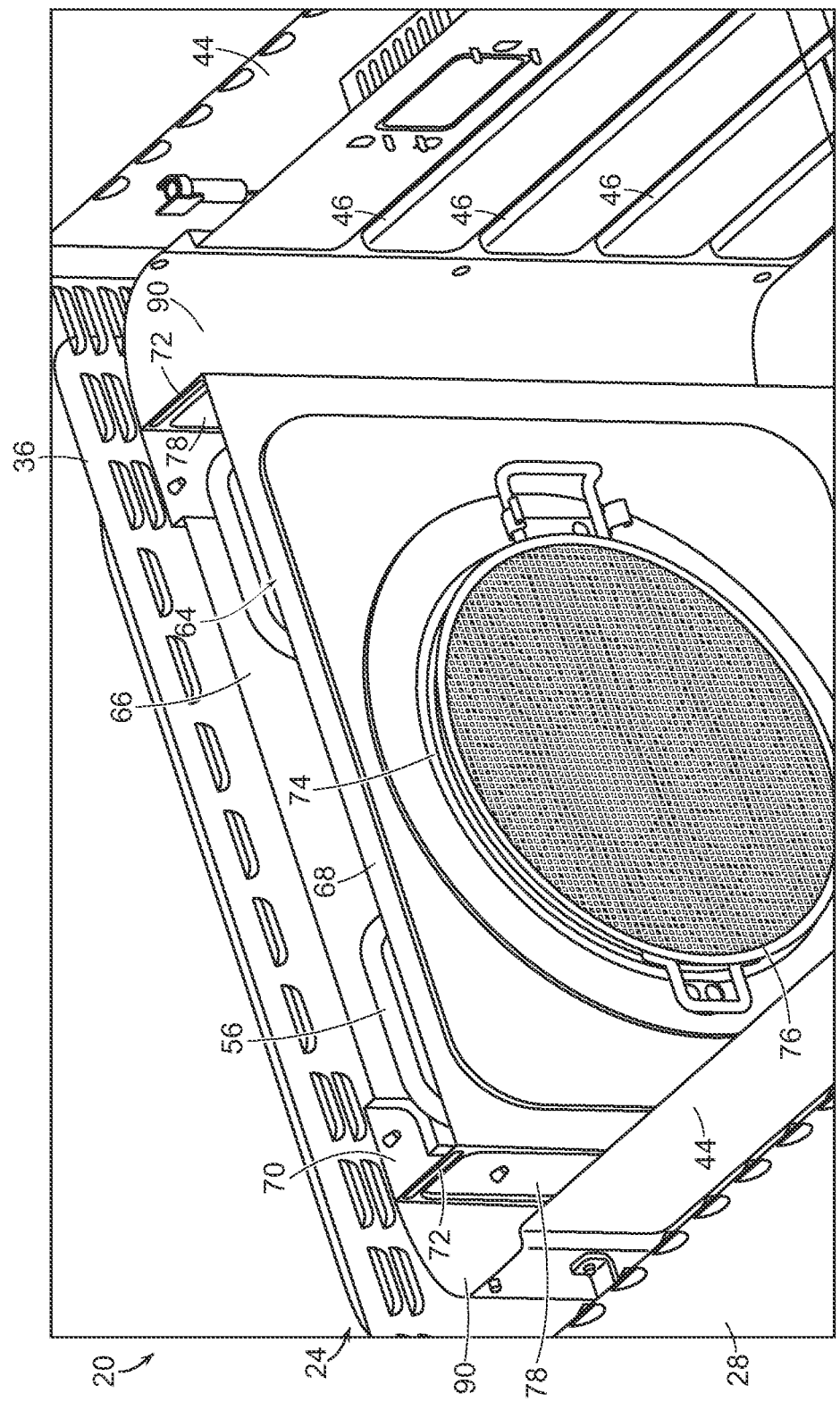
FIG. 6 is a perspective view of an interior of a cooking system according to an embodiment.

In an embodiment, best shown FIGS. 4-6, the cooking system 20 includes a convection heater 54 selectively operable to impart the heat to cooking chamber 42 during at least one mode of operation of the cooking system 20. The convection heater 54 may be positioned near an interior surface of the rear wall 36 of the housing 24. However, embodiments where the convection heater 54 is disposed adjacent another wall of the housing 24 are also contemplated herein. The convection heater 54 includes at least one convective heating element 56 configured to heat air as it passes over the convection heater 54 via an air movement device 58, such as a fan for example.

In an embodiment, an inlet 60 of the air movement device 58 is arranged at a first, generally planar surface of the air movement device 58, facing the cooking chamber 42, and an outlet 62 of the air movement device 58 is arranged about an outer periphery of the body of the air movement device 58. Accordingly, in an embodiment, the air movement device 58 is a radial fan operable to receive an axial airflow and exhaust the airflow radially outward. In such embodiments, the convection heater 54 may be mounted concentrically with the air movement device 58 such that the air output from the fan 58 passes over at least a portion of the convection heater 54 before returning to the cooking chamber 42. However, embodiments where the convection heater 54 is arranged at another location relative to the air movement device 58, for example just in front (upstream) from the inlet 60 of the air movement device 58, are also within the scope of the disclosure.

In an embodiment, the cooking system 20 includes a fan shroud 64 mounted adjacent the convective heating system. As shown, the fan shroud 64 is arranged adjacent the interior surface of the back wall 36 of the housing 24. The fan shroud 64 generally defines a convecting chamber 66 within the interior of the chamber 26 of the housing 24, separate from the cooking chamber 42, within which the convection heater 54 is located.

In the illustrated, non-limiting embodiment, the fan shroud 64 includes a first wall 68 and a second wall 70 separated from one another by distance, and two sides 72 extending between and coupling the first wall 68 and the second wall 70. In embodiments of the fan shroud 64 including both a first and second wall 68, 70, the second wall 70 may be mounted directly to an interior surface of a wall of the housing 24, such as the back wall 36 of the housing 24 for example, or alternatively, may be mounted at a position offset from the interior surface of the wall of the housing 24. However, embodiments where the fan shroud 64 includes only a first wall 68 with or without sides 72 (with the back wall 36 effectively serving as the second wall 70) are also within the scope of the disclosure. Indeed, the fan shroud 64 may be formed from a single piece of material, such as via a bending and welding operation for example, or alternatively, the fan shroud 64 may include multiple pieces permanently or removably connected together, with the piece or pieces of material extending vertically across a relative rear of the chamber 26 from the top wall 32 to the bottom wall 34. In an embodiment, the fan shroud 64 is formed from a metal material. However, it should be understood that any suitable material capable of withstanding the operating temperatures of the cooking system 20 is within the scope of the disclosure.

The first wall 68 of the fan shroud 64 forms a partition that separates the chamber 26 of the housing 24 into a cooking chamber 42 and the convecting chamber 66. The convecting chamber 66 is arranged in fluid communication with the cooking chamber 42 via the sides 72 of the fan shroud 64. The front of the convecting chamber 66 is defined by a surface of the first wall 68 of the fan shroud 64 and a back of the convecting chamber 66 may be defined by either the second wall 70 of the fan shroud 64, or alternatively in embodiments where the fan shroud 64 does not include a second wall 70, by the interior surface of the back wall 36 of the housing 24. As shown, the cooking chamber 42 extends between a surface of the first or front wall 68 the fan shroud 64, and the interior surfaces of the left and right sidewalls 28, 30, the top wall 32, the bottom wall 34, and the door 40.

A through hole 74 is formed in the fan shroud, such as in the first wall 68 for example, to define an inlet to convection heater 54 and the convecting chamber 66. The inlet 60 of the air movement device 58 may be positioned generally adjacent the through hole 74. In an embodiment, the through hole 74 may be generally equal to a diameter of the air movement device 58. However, in other embodiments, the through hole 74 may be smaller than the diameter of the air movement device 58. Further, in an embodiment, a guard 76 may be positioned in overlapping arrangement with the through hole 74. Inclusion of the guard 76 is intended to prevents food entrained within the air flow from being drawn into the fan and/or provided to the convection heater 54. The guard 76 may include a body formed from at least one layer of material 77. In the illustrated, non-limiting embodiment, the body includes a plurality of overlapping layers of material. However, it should be understood that a guard 76 including only single layer of material, or alternatively, more than two layers of material are also within the scope of the disclosure.

The at least one layer 77 of the guard 76 is permeable to air and water vapor. The layer 77 may be selected from any suitable heat-resistant material. In an embodiment, the material used to form one or more of the layers 77 of the guard is a non-absorbent material, such as a metal wire mesh for example. The configuration of the mesh, such as the size of the apertures of the mesh for example, is selected such that projectile matter generated during a cooking operation, such as fat or oil for example, is substantially blocked from passage through the apertures. However, the sizes of the apertures may also be selected to allow a flow of air and heat, sufficient for performing a convective cooking operation for example, to pass through the material In the illustrated, non-limiting embodiment, at least the first wall 68 (and possibly also the second wall 70) of the fan shroud 64 includes a lesser horizontal length than the back wall 36 of the housing 24. As a result, the sides 72 of the fan shroud 64 are offset from the interior surfaces of the left and right sidewalls 28, 30, respectively. Further, the fan shroud 64 may extend vertically from adjacent the interior surface of the top wall 32 to the interior surface of the bottom wall 34 of the housing 24, also referred to herein as the ceiling and floor of the interior of the housing 24. Alternatively, the fan shroud 64 may extend vertically from adjacent a heating element 50 to the interior surface of the bottom wall 34.

One or more openings 78 are formed at each lateral side 72 of the fan shroud 64 to define an outlet of the convecting chamber 66. The outlet of the convecting chamber 66 may extend generally perpendicularly between the first and second walls 68, 70, or may be arranged at an angle there between. In an embodiment, a single opening 78 extends over substantially the entire height of the fan shroud 64. However, in other embodiments, a plurality of distinct openings 78, separated from one another by portions of the side 72, may be formed over substantially the height of the fan shroud 64.

In an embodiment, the width of the openings 78 of the fan shroud 64 are optimized to raise the pressure within the convecting chamber 66 without substantially impacting the overall air flow rate. As a result, the heated air flow is forced out of the openings 78 at the sides 72 of the fan shroud evenly over the height of the interior of the housing 24. Additionally, the fan shroud 64 is designed to reduce the spin applied to the air by the air movement device which reduces the presence of localized hot spots within the cooking chamber 42. Further, inclusion of the fan shroud 64 increases the distance between the inlet 60 and the outlet of the air movement device 58 and facilitates maintenance of a sufficiently high velocity of the airflow at the outlet in a direction away from the inlet 60. This reduces the likelihood of "short circuiting" where air provided at the outlet 62 of the air movement device 58 is quickly sucked back into the inlet 60 instead of circulating through the cooking chamber 42.

Figure 7:
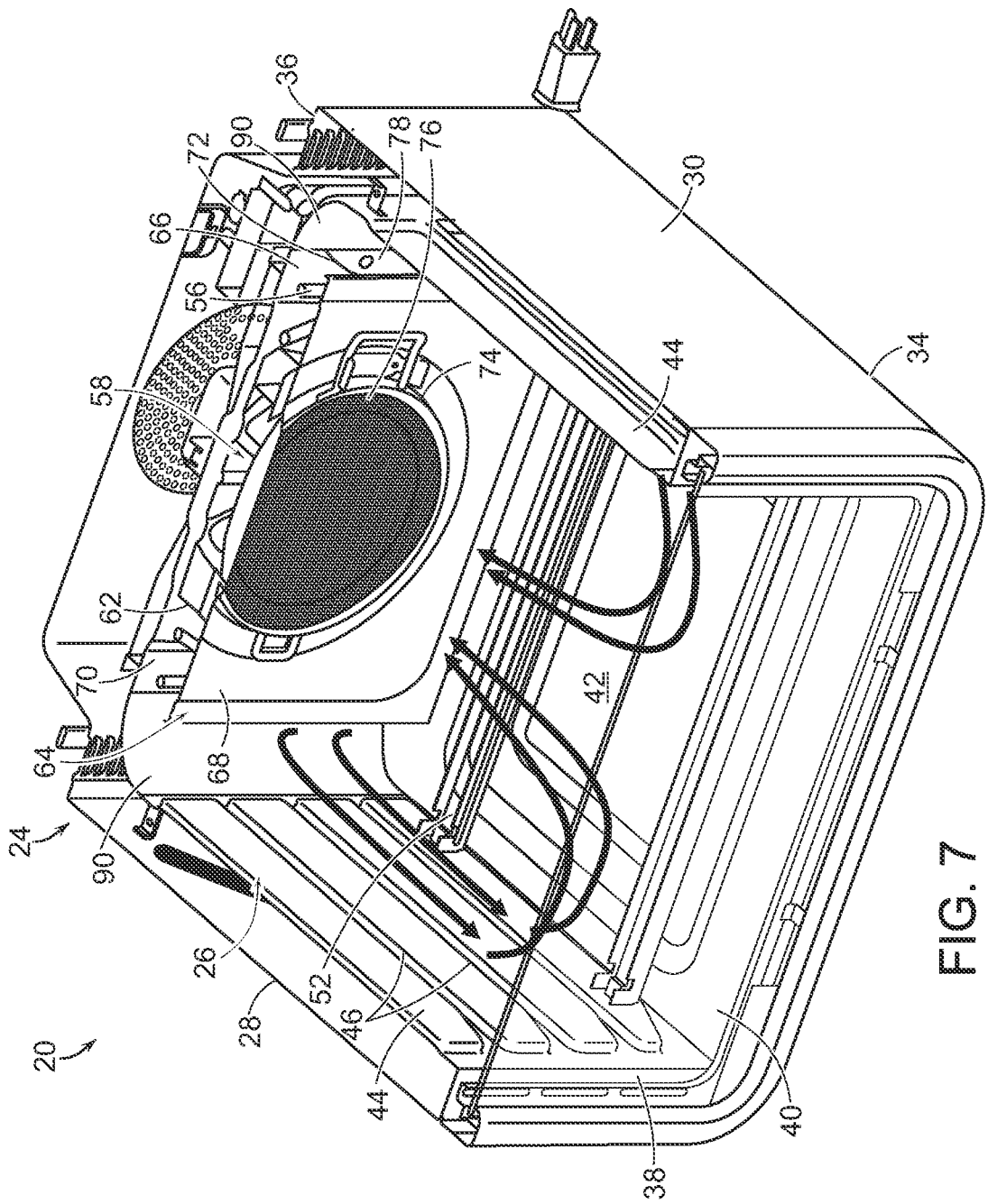
FIG. 7 is a detailed perspective view of a portion of an interior of a cooking system according to an embodiment.

In use, the convection heater 54 moves air through the housing chamber 26 (from the convecting chamber 66 to the cooking chamber 42 and back) as shown in FIG. 7. Rotation of the air movement device 58 draws air axially, via the through hole 74 formed in the fan shroud 64, to the inlet 60 and expels the air radially outwardly, causing the air to flow over the convective heating element 56. As the air moves across the convective heating element 56, the air is heated. The air is then output from the convecting chamber 66 via the openings 78 formed at the sides 72 of the fan shroud 64. Because the openings 78 extend generally over the full height of the fan shroud 64, and therefore generally between the floor and ceiling of the housing 24, a uniform, curtain like-flow of heated air flow is output from the convecting chamber 66.

Arranged directly adjacent at least one side 72 of the fan shroud 64 or the lateral edge # of the first wall 68 if no sides 72 are present, extending generally between the fan shroud 64 and the interior surface of the adjacent sidewall 28, 30 is a deflecting vent or guide 90. The guides 90 extend from or along the second wall 70 of the fan shroud 64 or the rear wall 36 of the housing 24. Accordingly, these guides effectively form a portion of the rear of both the housing chamber 26 and the convecting chamber 66. In the exemplary embodiment shown in the Figures, the guides 90 extend at least from the openings 78 to the fixtures 44. The guides 90 may be a separate component, or alternatively, may be integrally formed with one or more of the walls of the housing 24, the fan shroud 64, and/or the fixture 44. A contour of the guide 90 is selected to smoothly direct the air output from the convecting chamber 66 toward the cooking chamber 42 as shown via arrows in FIG. 7. Although the guide 90 is illustrated as having a generally arcuate contour extending from immediately adjacent the openings 78, it should be understood that a guide having any suitable shape is within the scope of the disclosure.

The openings or vents 78 that extend generally between the floor and the ceiling of the interior of the housing 24 generate a more even distribution of airflow between the top and bottom and left and right of the cooking chamber 42. As a result, more even cooking occurs within the cooking chamber 42, thereby eliminating the need for a user to reposition food within the cooking chamber 42 during a cooking operation.

From the guide 90, the air flow output from the convecting chamber 66 is directed along the interior surfaces of the sidewalls 28, 30 or fixtures 44, within the cooking chamber 42, towards the door 40. This curtain of hot air extending between the interior surfaces of the top and bottom walls 32, 34 of the housing 24 is configured to deflect off the door 40 and is drawn toward the center of the cooking chamber 42 by the air movement device 58 as shown via the arrows.

The convection heater 54 may be used independently or in combination with the heating elements 50, 52 in a second cooking mode. Examples of cooking operations that may be performed in the second cooking mode include, but are not limited to air frying, air roasting, whole roasting, dehydrating, and cooking a pizza. It should be understood that a speed of the fan may vary based on the selected cooking operation to be performed. As a result, different functions may be achieve even when the heating elements that are energized are the same.

With reference again to FIG. 1, a control panel or user interface 80 for operating the cooking system 20 is mounted to an exterior portion of the housing 24, for example to a handle 81 extending from the door 40. The control panel 80 is part of a control system 82 (see FIG. 8) that is electrically connected to the one or more heating elements 50, 52 and the convection heater 54. The control panel 80 includes one or more inputs 84 associated with energizing the one or more heating elements 50, 52 and the convection heater 54 of the cooking system 20 and for selecting various modes of operation of the cooking system 20. One or more of the inputs 84 may include a light or other indicator to show that the respective input 84 has been selected. The control panel 80 may additionally include a display 86 separate from and associated with the at least one input 84. However, embodiments where the display 86 is integrated into the at least one input 84 are also contemplated herein.

Figure 8:
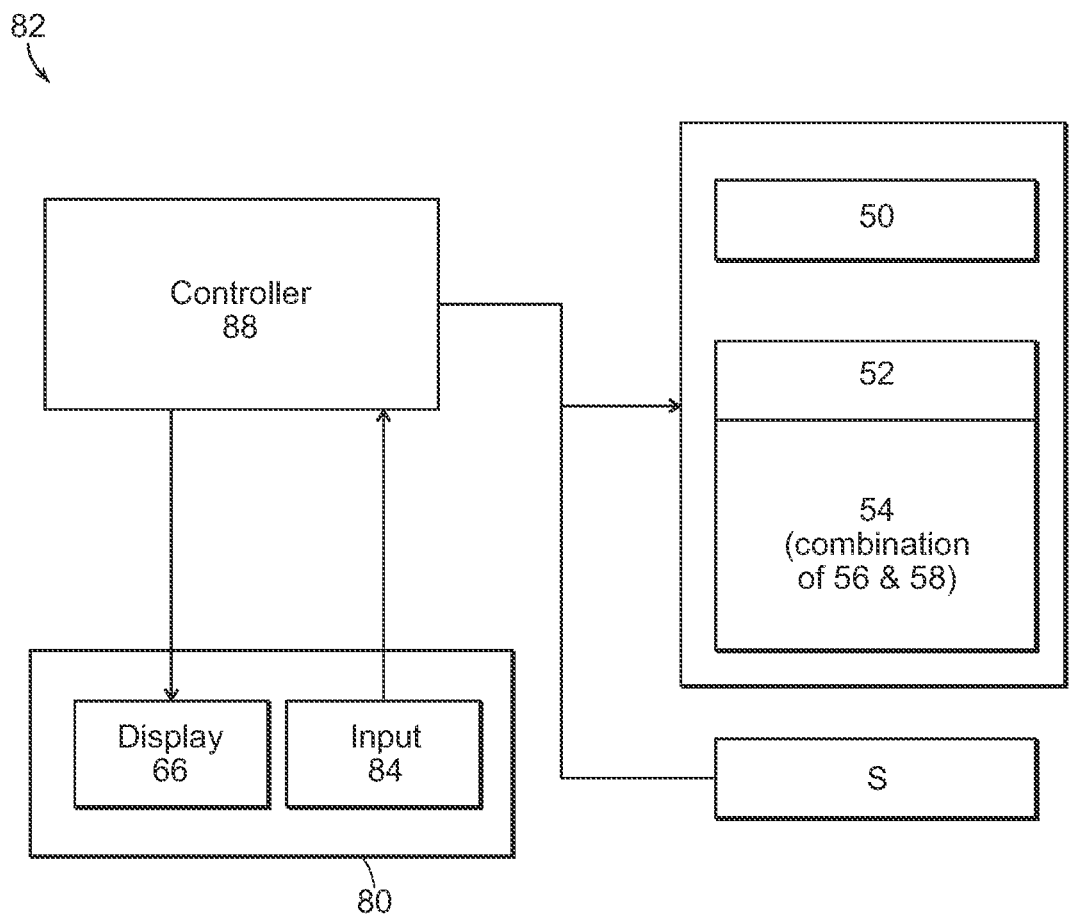
FIG. 8 is a schematic diagram of a control system of the cooking system according to an embodiment.

Operation of the one or more inputs 84 will be described in more detail below. As shown in FIG. 8, the control system 82 includes a controller or processor 88 for controlling operation of the heating elements 50, 52 and the convection heater 54, in response to a user input provided via the one or more inputs 84 and for using algorithms to execute stored sequences of heating operation. In embodiments where the cooking system 20 includes a plurality of heating elements 50, 52 and the convection heater 54, the heating elements 50, 52 and the convection heater 54, may be independently operable. Further, the heating output of one or more of the heating elements 50, 52 and the convection heater 54 may be variable in response to the power supplied to the heating elements 50, 52 and the convection heater 54. The control system 82 may include one or more sensors S arranged in communication with the processor 88 and operable to monitor one or more parameters, for example temperature within the cooking chamber 42.

In an embodiment, when the control panel 80 is deactivated, none of the heating elements 50, 52 or the convection heater 54 is energized. In an exemplary embodiment, the at least one input 84 is operable to select and/or initiate one or more modes of operation of the cooking system 20. As previously described, examples of modes of operation of the cooking system 20 include, but are not limited to, toast, bake, broil, grill, warm, reheat, and air fry, roast, and pizza. Independent control of the heating elements 50, 52 and the convection heater 54 allows a user to configure a cooking/heating cycle based on the type of food item positioned within the cooking chamber 42. In an embodiment, one or more of the cooking modes has a stored sequence of operation of at least one heating element 50, 52 and/or the convection heater 54 associated therewith. Such a stored sequence may be stored within a memory accessible by the processor 88 or may be stored remotely from the cooking system 20 and may be accessed by the processor 88, such as via wireless communication for example. In addition, a user may be able to enter one or more parameters associated with operation of the cooking system 20, such as cooking time, temperature, or toasting color for example, via inputs 84.

The one or more inputs 84 are operable to initiate operation of the cooking system 20 in at least a first cooking mode and a second cooking mode. During the first cooking mode, at least one of the first heating element 50 and the second heating element 52 is energized to heat the cooking chamber 42. In an embodiment, the second cooking mode includes performing a convective cooking operation, such as air frying for example. In the second cooking mode, the controller 88 operates the convection heater 54, specifically the convective heating element 56 and the air movement device 58, to circulate hot air from the convecting chamber 66 into the cooking chamber 42 (the air flow is represented by arrows in FIG. 5). During operation in the air fryer mode, the first and second heating elements 50, 52, are generally not energized. However, in some embodiments, the first and second heating elements 50, 52 may be energized during at least a portion of the air fryer mode, or another one of the cooking modes of the system 20.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any nonclaimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system positionable on a support surface, the cooking system comprising:
    a housing including at least a top wall, bottom wall, a rear wall, and side walls, the housing defining a hollow chamber including a cooking chamber and a convecting chamber;
    a fan shroud mounted within the hollow chamber and having a front shroud wall, a rear shroud wall, and two shroud sidewalls each connected perpendicularly to each of the front and rear shroud walls, wherein each of the front shroud wall, the rear shroud wall, and the two shroud sidewalls extend from the top wall to the bottom wall, wherein the fan shroud forms a partition that separates the cooking chamber and the convecting chamber and includes a through hole in the front shroud wall;
    a guard positioned in overlapping arrangement with the through hole, the guard including a plurality of through holes;
    a convection heater disposed within the convecting chamber; and
    at least one fluidly communicable opening between said convecting chamber and the cooking chamber positioned in each of the two shroud sidewalls.

2. The cooking system of claim 1, wherein said convection heater includes an air movement device and a convection heating element for heating an air flow moved by said air movement device.

3. The cooking system of claim 2, wherein said convection heating element is mounted concentrically with said air movement device.

4. The cooking system of claim 1, wherein the fan shroud is mounted to a portion of the housing.

5. The cooking system of claim 4, wherein the fan shroud is positioned adjacent the rear wall.

6. The cooking system of claim 4, wherein said fan shroud is positioned adjacent one of said side walls of said housing.

7. The cooking system of claim 1, wherein the through hole defines an inlet of the convecting chamber and is arranged adjacent a center of the front shroud wall and the at least one fluidly communicable opening between the convecting chamber and the cooking chamber defines an outlet of the convecting chamber.

8. The cooking system of claim 1, wherein the through hole defines an inlet of the convecting chamber, the through hole being formed in the first front shroud wall, and a portion of the convection heater is mounted adjacent the through hole.

9. The cooking system of claim 1, wherein the at least one fluidly communicable opening between the convecting chamber and the cooking chamber defines an outlet of the convecting chamber, and further comprising a guide mounted directly adjacent the outlet of said convecting chamber, wherein a contour of the guide is selected to direct an air flow at the outlet towards the cooking chamber.

10. The cooking system of claim 9, wherein said guide has a generally arcuate contour.

11. The cooking system of claim 10, wherein the through hole defines an inlet of the convecting chamber, and the guard is mounted adjacent to the inlet to the convecting chamber, the guard being located upstream from the convection heater relative to a flow of air circulating within the hollow chamber.

12. The cooking system of claim 1, further comprising at least one heating element mounted within said cooking chamber.

13. The cooking system of claim 12, wherein said at least one heating element is a radiant heating element.

14. The cooking system of claim 12, wherein the at least one heating element is at least one first heating element arranged near the top wall and at least one second heating element mounted near the bottom wall.

\* \* \* \* \*